(12) United States Patent
Lee et al.

(10) Patent No.: US 11,964,520 B2
(45) Date of Patent: Apr. 23, 2024

(54) PACKAGING METHOD FOR TIRE PRESSURE MONITORING SENSOR

(71) Applicants: Sheng-Hao Lee, Taipei (TW); Shih-Yao Lin, Taipei (TW)

(72) Inventors: Sheng-Hao Lee, Taipei (TW); Shih-Yao Lin, Taipei (TW)

(73) Assignee: SYSGRATION LTD., Taipei (TW)

( * ) Notice: Subject to any disclaimer, the term of this patent is extended or adjusted under 35 U.S.C. 154(b) by 277 days.

(21) Appl. No.: 17/577,380

(22) Filed: Jan. 18, 2022

(65) Prior Publication Data

US 2022/0242177 A1 Aug. 4, 2022

(30) Foreign Application Priority Data

Feb. 2, 2021 (TW) .................. 110103796

(51) Int. Cl.
*B60C 23/04* (2006.01)
*H01Q 1/22* (2006.01)

(52) U.S. Cl.
CPC ...... *B60C 23/0491* (2013.01); *B60C 23/0447* (2013.01); *H01Q 1/2241* (2013.01)

(58) Field of Classification Search
CPC ............ B60C 23/0491; B60C 23/0447; B60C 23/0494; B60C 23/04; H01Q 1/2241; H01Q 1/40; B29C 39/10; B29C 39/24; B29C 39/26; B29C 45/14; B29C 35/02; B29C 45/14008; B29C 45/14065; B29C 45/40; B29C 2045/14122; B29C 2045/14852; B29B 11/04; G01L 17/00; B29D 30/0061; B29D 2030/0083
USPC ........................................... 340/442
See application file for complete search history.

(56) References Cited

U.S. PATENT DOCUMENTS 6,958,684 B2 * 10/2005 Lin ..................... B60C 23/0408
340/447
8,919,188 B2 * 12/2014 Li ........................... B60C 23/04
73/146

FOREIGN PATENT DOCUMENTS

KR 20180063760 A * 6/2018

* cited by examiner

*Primary Examiner* — Eric Blount

(57) ABSTRACT

A packaging method for a tire pressure monitoring sensor includes a step of placing, a step of pouring, and a step of hardening. In the step of placing, a sensing transmission module is put into a cavity of a modeling unit, and a positioning portion in the cavity restricts the sensing transmission module from moving transversely and toward an inner bottom of the cavity. In the step of pouring, a rubber compound is poured into the cavity and fills the cavity. The sensing transmission module is coated by the rubber compound to form a case on the outer surface of the sensing transmission module. In the step of hardening, the case is hardened and integrally formed with the sensing transmission module to form a tire pressure monitoring sensor which is removed from the cavity.

5 Claims, 8 Drawing Sheets

PACKAGING METHOD FOR TIRE PRESSURE MONITORING SENSOR

BACKGROUND OF THE INVENTION

1. Fields of the Invention

The present invention relates to a packaging method for a tire pressure monitoring sensor.

2. Descriptions of Related Art

Tires of a vehicle carry the weight of the vehicle body and contacts the ground so as to perform turning, accelerating, braking and absorbing shocks from the ground, so that the tires are inflated by pressure that maintains the tires with proper shape, and the proper shape of the tires ensure the above mentioned functions are correctly performed. However, the air in the tires will gradually leak via tiny cracks or gaps of the tire valve. Alternatively, the tires may be punctured by foreign objects and cause leakage. Therefore, the tire pressure needs to be checked before the vehicle is driven on roads. It is necessary to keep the tire with the standard tire pressure.

The tire pressure monitoring sensor (TPMS) automatically monitors the tire pressure and temperature, and reports real-time tire-pressure and temperature to the driver. The TPMS is usually installed within the tire or installed to the tire valve. The conventional TPMS is coated by a case so as to provide the TPMS.

The case for the TPMS is made by a modeling unit and/or a method of plastic injection modeling. The sensing transmission module of the TPMS is then installed in the case by bolts, rivets or snapping means. Sealing rings are used between the sensing transmission module of the TPMS and the case to keep moisture from entering into the case to protect the circuit of the pressure sensor and the sensing transmission module of the TPMS. The case is composed of two halves which are connected to each other to seal the sensing transmission module of the TPMS in the case. Alternatively, the case is composed of a base and cover which is mounted to the base. There are multiple steps for assembling the sensing transmission module of the TPMS into the case, and to seal the case. The manufacturing efficiency is low due to the complicated and multiple steps.

The present invention intends to provide a packaging method for a tire pressure monitoring sensor to eliminate the shortcomings mentioned above.

SUMMARY OF THE INVENTION

The present invention relates to a packaging method for a tire pressure monitoring sensor includes a step of placing, a step of pouring, and a step of hardening. In the step of placing, a sensing transmission module is put into a cavity of a modeling unit, and a positioning portion in the cavity restricts the sensing transmission module from moving transversely and toward an inner bottom of the cavity. In the step of pouring, a rubber compound is poured into the cavity and fills the cavity. The sensing transmission module is coated by the rubber compound to form a case on the outer surface of the sensing transmission module. In the step of hardening, the case is hardened and integrally formed with the sensing transmission module to form a tire pressure monitoring sensor which is removed from the cavity.

The present invention also provides another packaging method for a tire pressure monitoring sensor, and the method comprises a step of pre-assembling, a step of placing, a step of pouring and a step of hardening. In the step of pre-assembling, a sensing transmission module and a frame are assembled to form a pre-set portion which includes multiple paths. In the step of placing, the pre-set portion is put into a cavity of a modeling unit. A positioning portion located in the cavity restricts the pre-set portion from moving transversely and toward the inner bottom of the cavity. In the step of pouring, a rubber compound is poured into the cavity and partially flows to the inner bottom of the cavity via the paths. A portion of the rubber compound coats the outer surface of the pre-set portion and fills the cavity so as to form a case on the outer surface of the pre-set portion. In the step of hardening, the case is hardened and integrally formed with the pre-set portion to form a tire pressure monitoring sensor which is then removed from the cavity.

The present invention provides simplified and efficient packaging methods for a tire pressure monitoring sensor so as to increase the manufacturing efficiency.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
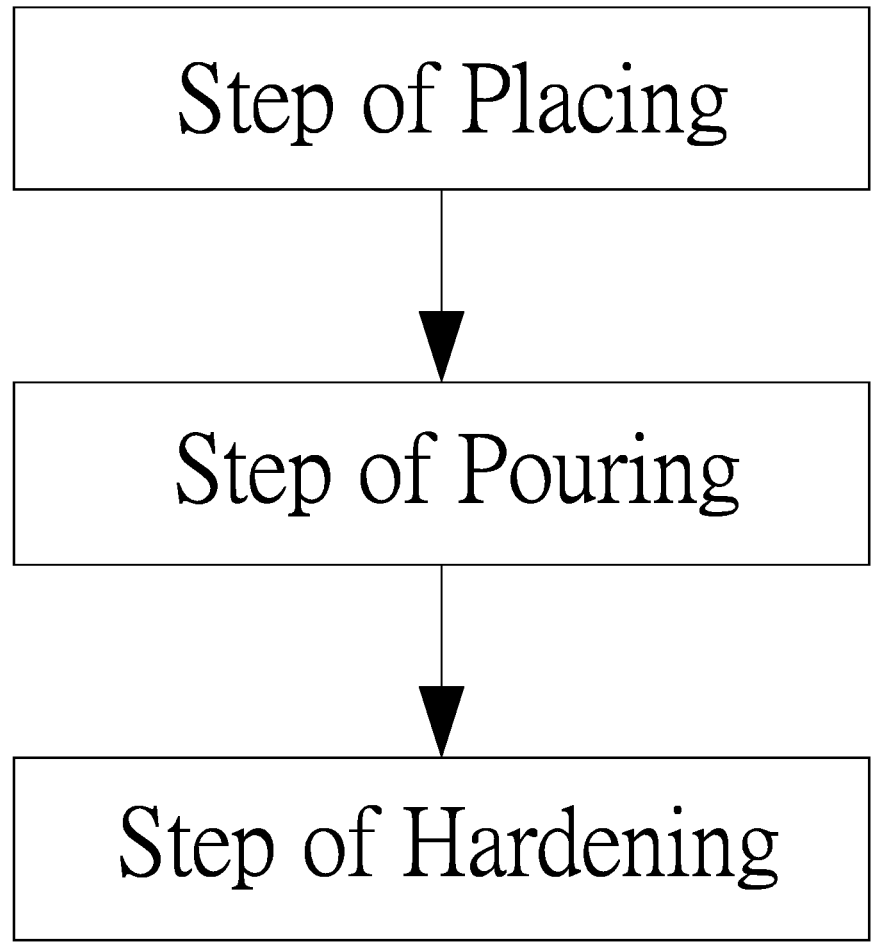
FIG. 1 illustrates the steps of the first embodiment of the method of the present invention.
Figure 2:
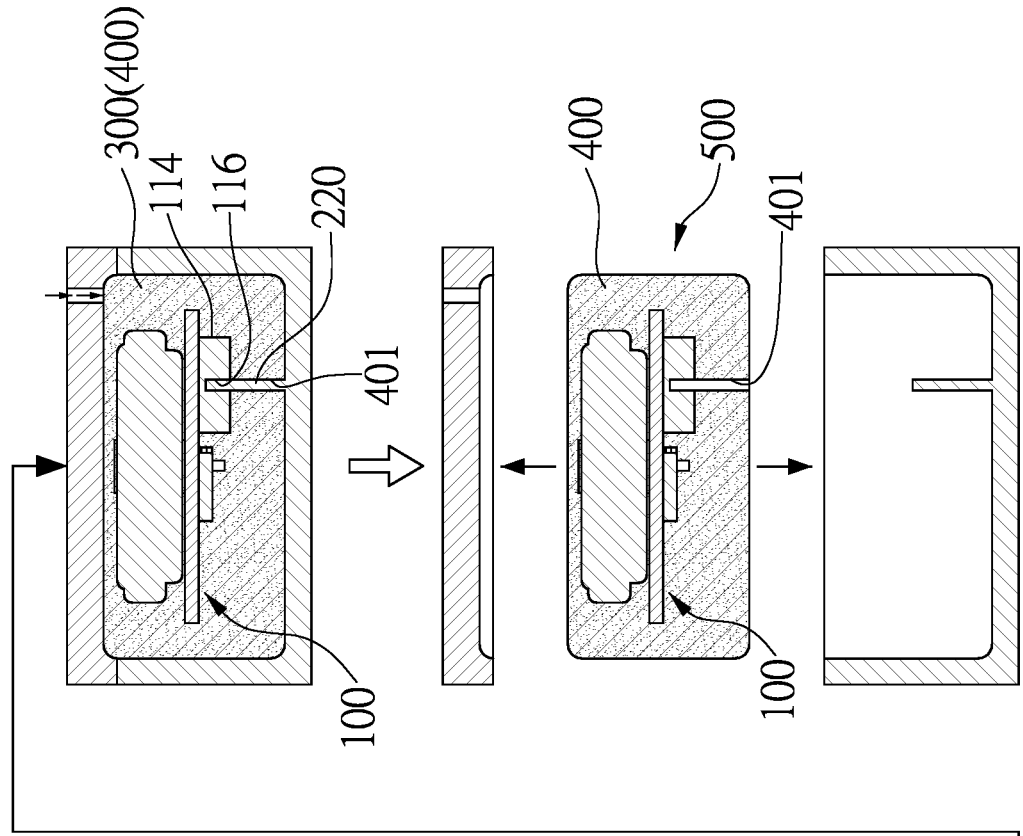
FIG. 2 illustrates the operations of the first embodiment of the steps of the method of the present invention.
Figure 2:
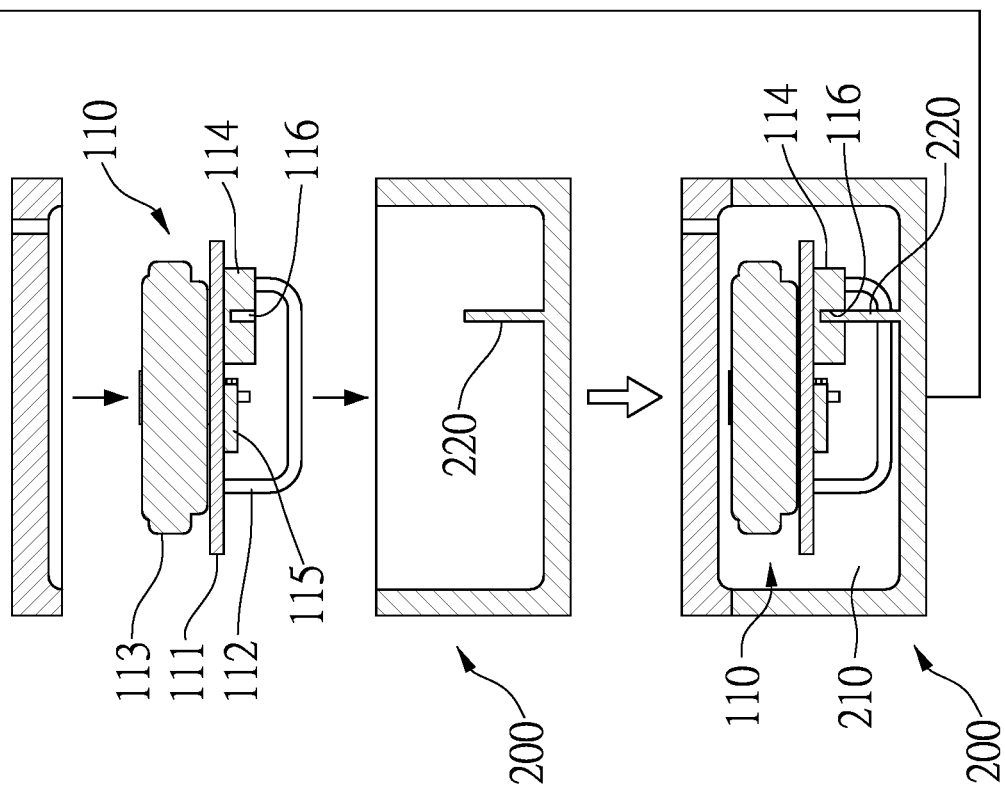
Figure 3:
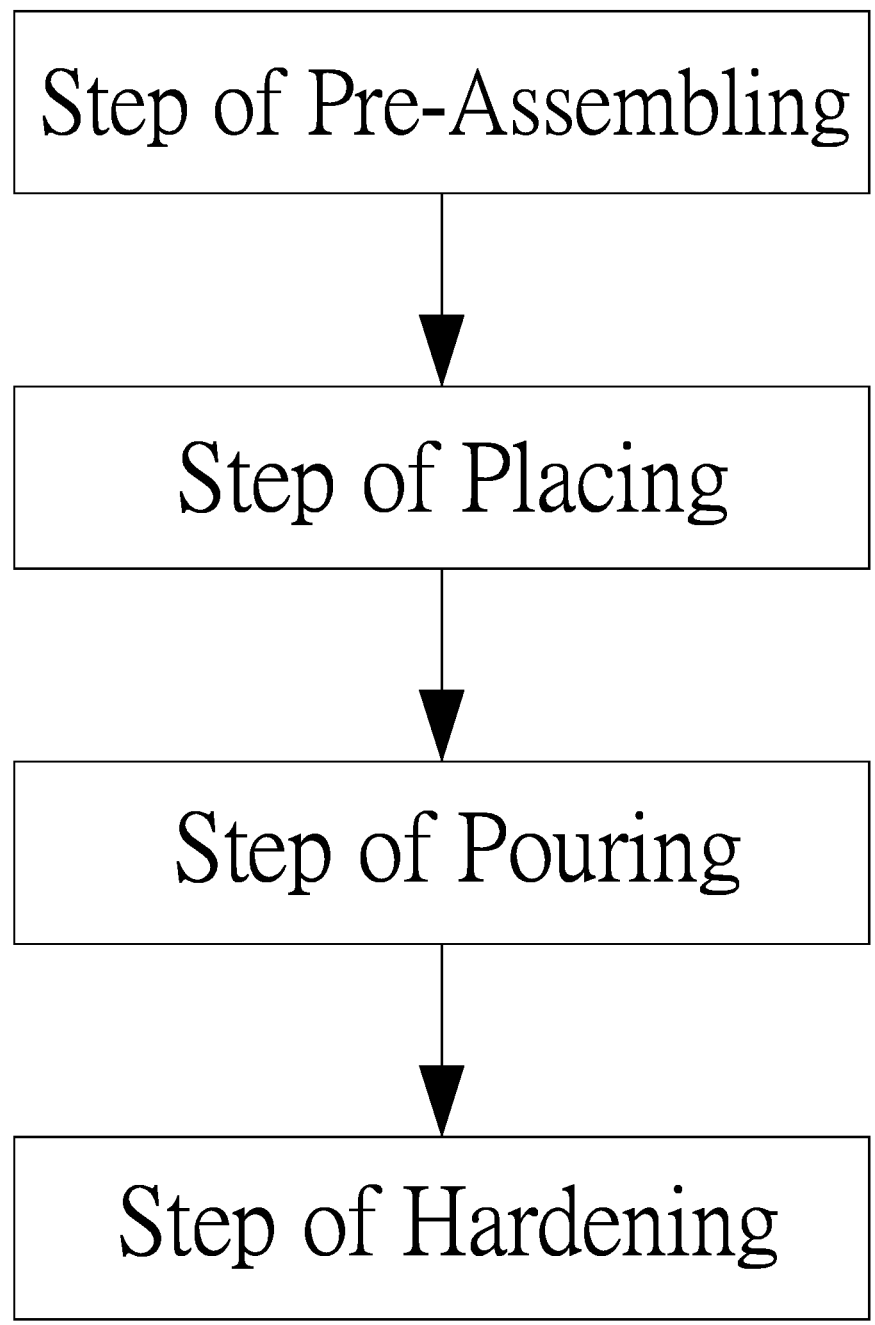
FIG. 3 illustrates the steps of the second embodiment of the method of the present invention.
Figure 4:
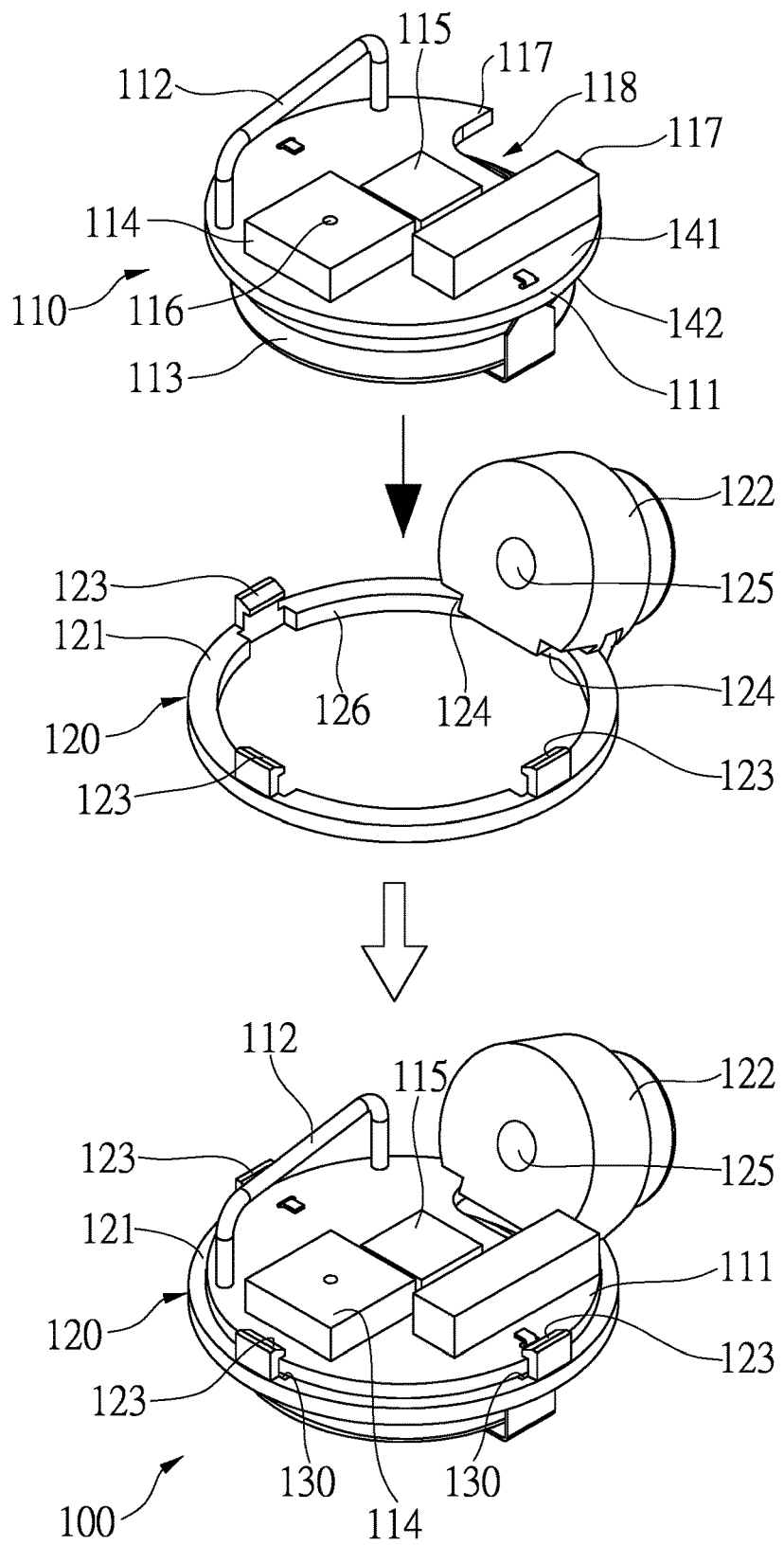
FIG. 4 illustrates the operations of the step of pre-assembling of the second embodiment of the method of the present invention.
Figure 5:
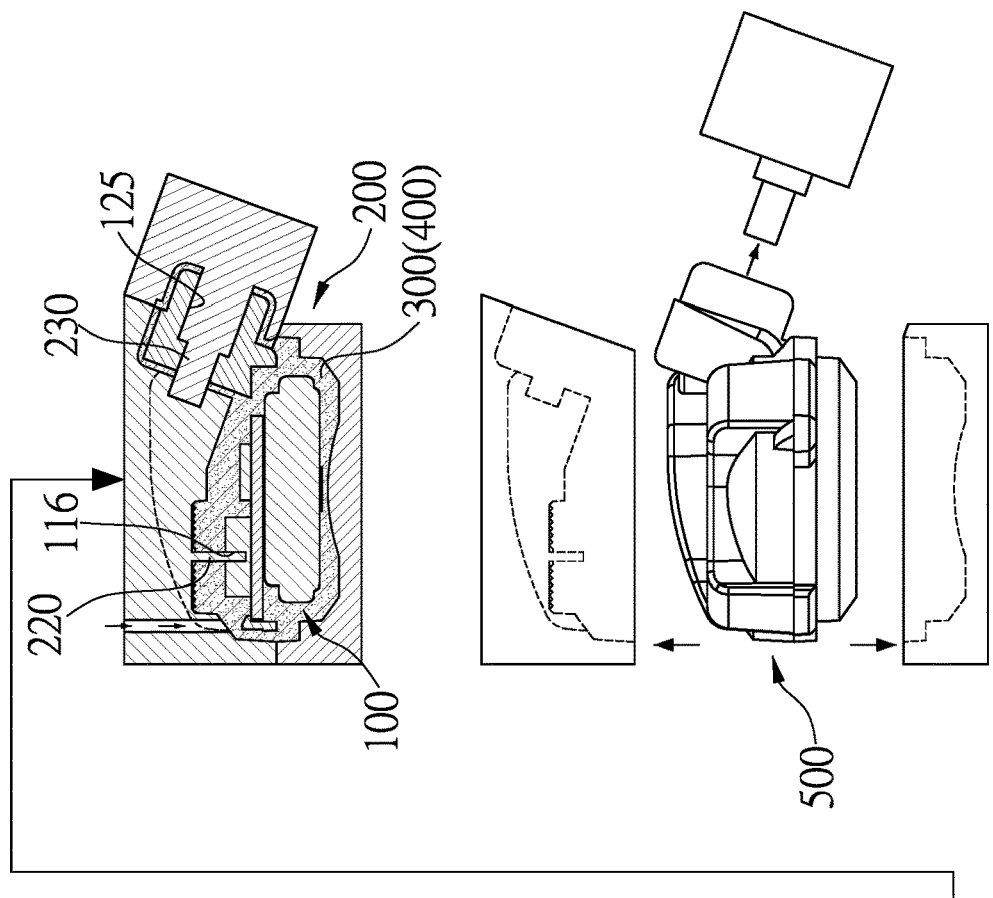
FIG. 5 illustrates the operations of the step placing to the step of hardening of the second embodiment of the method of the present invention.
Figure 5:
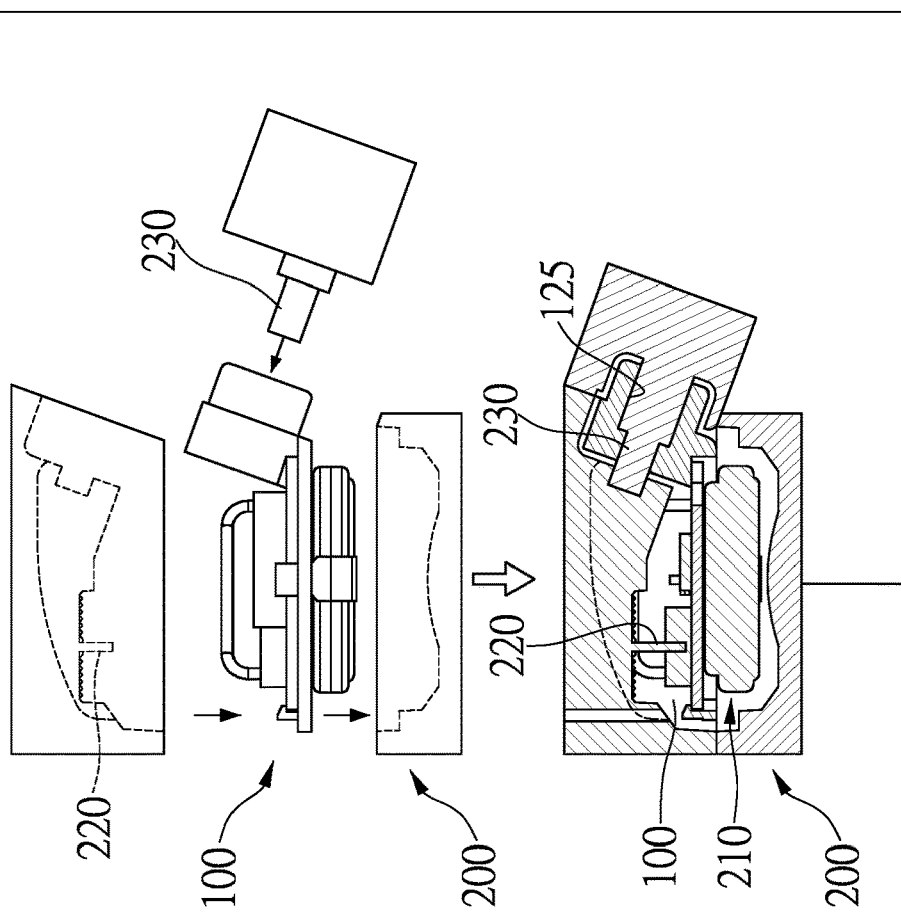

Referring to FIGS. 1 and 2, the first embodiment of the packaging method for a tire pressure monitoring sensor comprises a step of placing, a step of pouring, and a step of hardening.

In the step of placing, a sensing transmission module 110 is put into a cavity 210 of a modeling unit 200. A positioning portion located in the cavity 210 restricts the sensing transmission module 110 from moving transversely and toward an inner bottom of the cavity 210. In the step of pouring, a rubber compound 300 is poured into the cavity 210 so as to fill the cavity 210. The outer surface of the sensing transmission module 110 is coated by the rubber compound 300 so as to form a case 400 on the outer surface of the sensing transmission module 110. The outer surface of the sensing transmission module 110 means the outer surface of each component of the sensing transmission module 110. In the step of hardening, the case 400 is hardened and integrally formed with the sensing transmission module 110 so as to form the tire pressure monitoring sensor 500. The tire pressure monitoring sensor 500 is then removed from the cavity 200.

The tire pressure monitoring sensor 500 mentioned above is adhered to the inside of the tire.

The sensing transmission module 110 includes a circuit board 111, a wireless antenna 112, a battery unit 113, an air pressure sensor unit 114 and a control unit 115. The wireless antenna 112, the battery unit 113, the air pressure sensor unit 114 and the control unit 115 are electrically connected to the circuit board 111. The air pressure sensor unit 114 includes an air pressure hole 116, and the positioning portion includes a plug 220. In the step of placing, the plug 220 partially extends into the air pressure hole 116, and the plug 220 is partially located in the cavity 210 so as to forma a gap between the sensing transmission module 110 and the inner bottom of the cavity 210. In the step of pouring, the rubber compound 300 does not flow to the air pressure hole 116 because of the plug 220. The rubber compound 300 is located around the plug 220 in the cavity 210 and forms a passage 401 of the case 400. The rubber compound 300 fills the gap between the sensing transmission module 110 and the inner bottom of the cavity 210. In the step of hardening, the tire pressure monitoring sensor 500 is removed from the cavity 210, and the passage 401 communicates with the air pressure hole 116. By the communication between the passage 401 and air pressure hole 116, the air pressure sensor unit 114 is able to detect the interior pressure of the tire.

The rubber compound 300 includes a base resin, a filler, a curing agent, a cross-linking agent and other auxiliary agents. Before placing the sensing transmission module 110 into the cavity 210 of the molding unit 200 in the step of placing, a release agent is applied to the surface of the cavity 210.

As shown in FIGS. 3 to 6, the second embodiment of the packaging method for a tire pressure monitoring sensor comprises a step of pre-assembling, a step of placing, a step of pouring and a step of hardening. In the step of pre-assembling, a sensing transmission module 110 and a frame 120 are assembled to form a pre-set portion 100 which includes multiple paths 130. In the step of placing, the pre-set portion 100 is placed into a cavity 210 of a modeling unit 200. A positioning portion located in the cavity 210 restricts the pre-set portion 100 from moving transversely and toward the inner bottom of the cavity 210. In the step of pouring, a rubber compound 300 is poured into the cavity 210. The rubber compound 300 partially flows to the inner bottom of the cavity 210 via the paths 130. A portion of the rubber compound 300 coats the outer surface of the pre-set portion 100 and fills the cavity 210 so as to form a case 400 on the outer surface of the pre-set portion 100. In the step of hardening, the case 400 is hardened and integrally formed with the pre-set portion 100 so as to form a tire pressure monitoring sensor 500. The tire pressure monitoring sensor 500 is then removed from the cavity 200.

The frame 120 includes an outer ring 121 and a valve coat 122 which is integrally formed to the outer ring 121. The sensing transmission module 110 includes a circuit board 111, a wireless antenna 112, a battery unit 113, an air pressure sensor unit 114 and a control unit 115. The wireless antenna 112, the battery unit 113, the air pressure sensor unit 114 and the control unit 115 are electrically connected to the circuit board 111. The circuit board 111 is mounted to the outer ring 121, and the outer ring 121 includes multiple pawls 123 which hook and position the circuit board 111. By the pawls 123 and the outer ring 121, the circuit board 111 is pre-assembled to the frame 120 so that the frame 120 well positions the circuit board 111 so that the rubber compound 300 does not move the circuit board 111 in the step of pouring.

The circuit board 111 includes a first side 141 and a second side 142 which is located opposite to the first side 141. The wireless antenna 112, the air pressure sensor unit 114 and the control unit 115 are located on the first side 141. The second side 142 of the circuit board 111 contacts the outer ring 121 of the frame 120. The battery unit 113 is located on the second side 142. By the specific allocation that the wireless antenna 112, the air pressure sensor unit 114 and the control unit 115 are located on the first side 141, and the battery unit 113 is located on the second side 142, the weight is controlled and balanced.

The valve coat 122 include two recesses 124 which are respectively formed two sides of the valve coat 122 that is connected to the outer ring 121. The circuit board 111 includes a yoke 117 in which a notch 118 is formed. Two insides of the yoke 117 are engaged with the two recesses 124. The notch 118 accommodates a portion of the valve coat 122. The paths 130 are partially located between the notch 118 and the valve coat 122. The paths 130 are partially formed in the inner periphery 126 of the outer ring 121 and located corresponding to the pawls 123. The rubber compound 300 flows through the paths 130 in the step of pouring. When the rubber compound 300 is hardened and forms the case 400 which is integrally formed with the pre-set portion 100 so as to reinforce the connection strength of the case 400 and the pre-set portion 100.

The valve coat 122 includes a bore 125 defined therethrough. The air pressure sensor unit 114 includes an air pressure hole 116. The positioning portion includes a plug 220 and a valve stein 230. In the step of placing, the plug 220 partially extends into the air pressure hole 116. The valve stein 230 partially extends into the bore 125. The plug 220 is partially located in the cavity 210. The valve stein 230 is partially located in the cavity 210. A gap is formed between the pre-set portion 100 and the inner bottom of the cavity 210. In the step of pouring, the rubber compound 300 does not flow to the air pressure hole 116 and the bore 125 because of the plug 220 and the valve step 230. The rubber compound 300 is located around the plug 220 in the cavity 210 and forms a passage 401 of the case 400. The rubber compound 300 fills the gap between the pre-set portion 100 and the inner bottom of the cavity 210. In the step of hardening, the tire pressure monitoring sensor 500 is removed from the cavity 210, and the passage 401 communicates with the air pressure hole 116. By the valve stein 230 and the plug 220 respectively inserted into the bore 125 and the air pressure hole 116, the pre-set assembly 100 is stably positioned in the cavity 210 of the modeling unit 200.

The plug 220 and the valve stein 230 can be integrally formed to the cavity 210 of the modeling unit 200, or are individually installed in the cavity 210. In addition, the modeling unit 200 is an automatic modularized modeling unit which can be assembled by multiple modules, and the assembled modules can be separated from each other.

Figure 6:
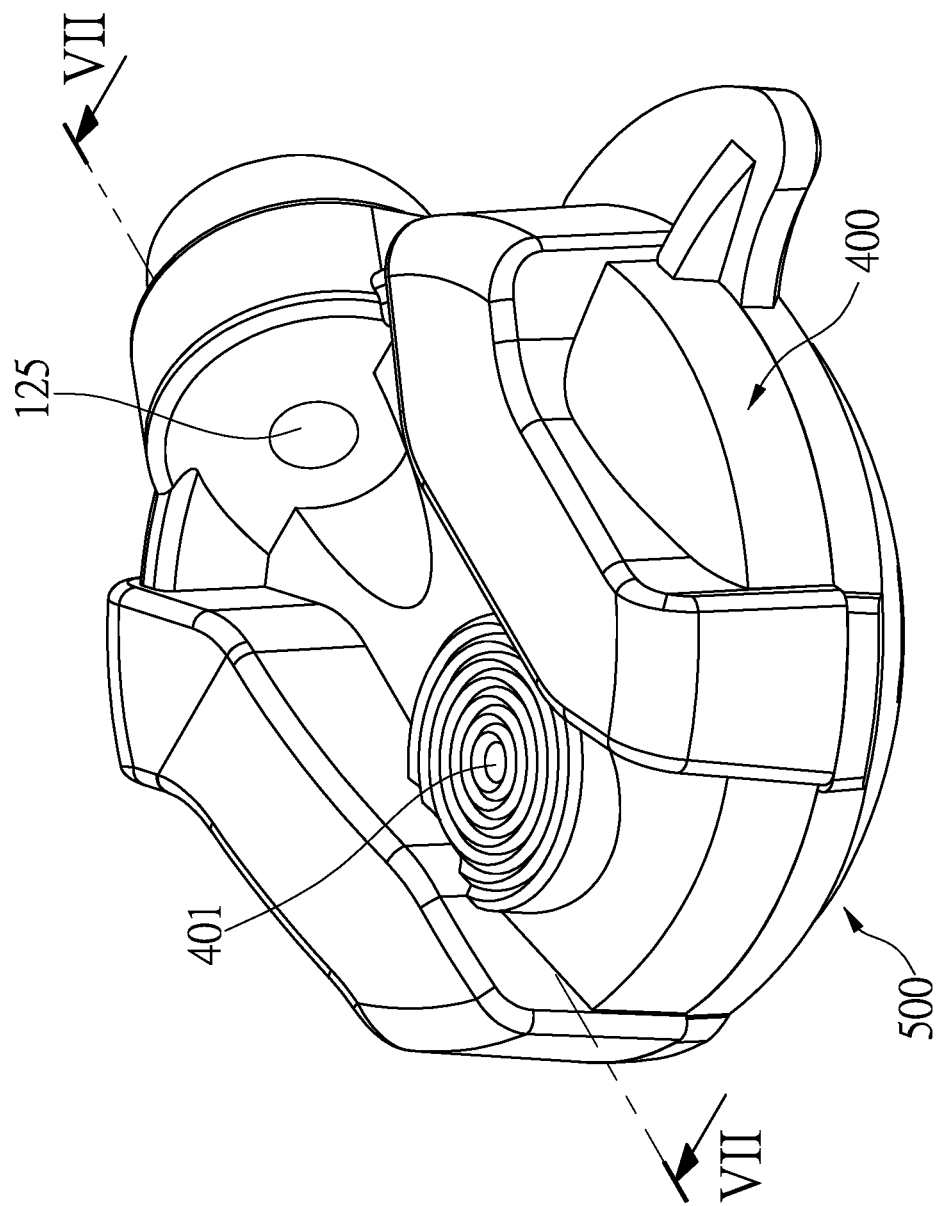
FIG. 6 shows the tire pressure monitoring sensor made by the second embodiment of the method of the present invention.
Figure 7:
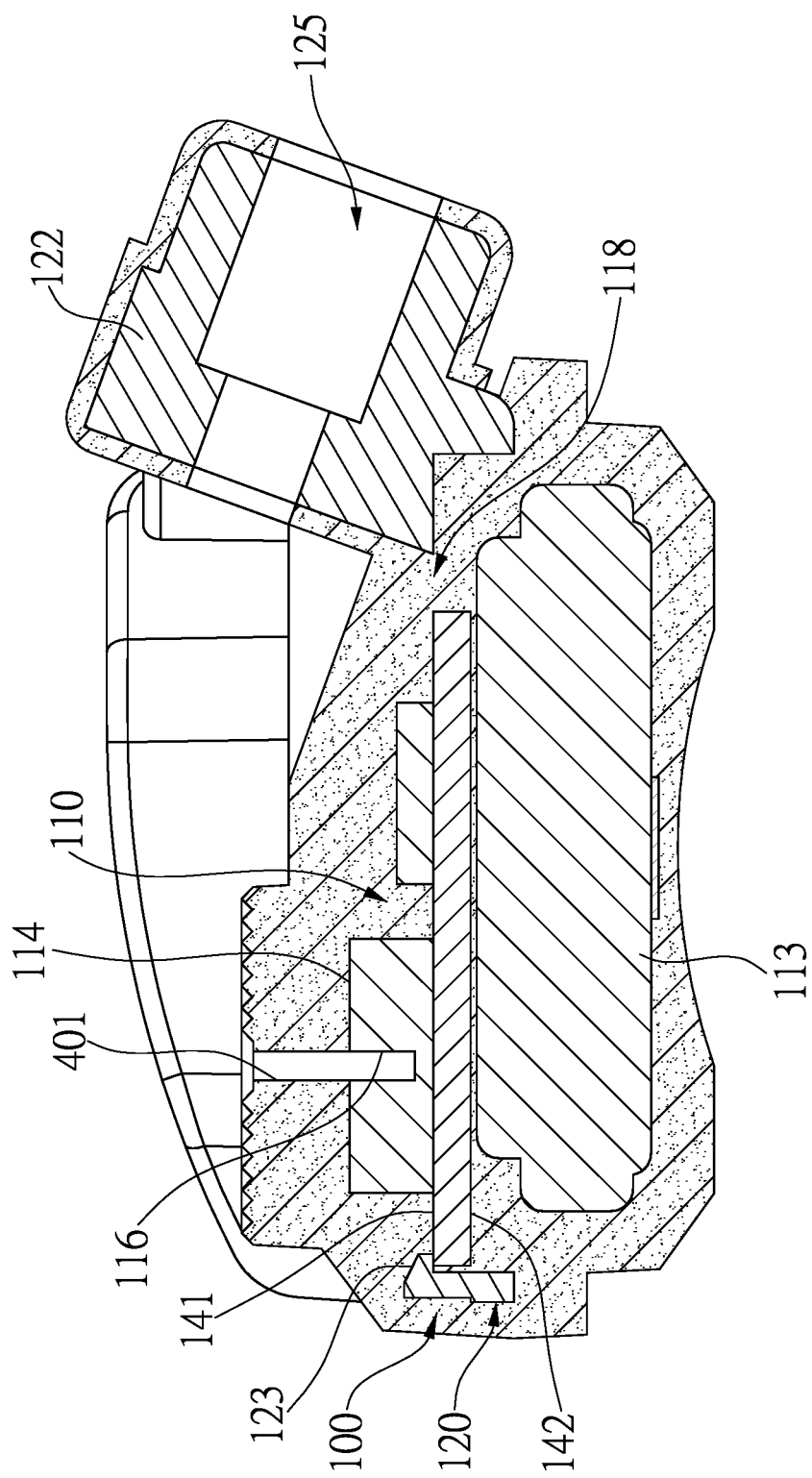
FIG. 7 is a cross sectional view, taken along line VII-VII in FIG. 6.
Figure 8:
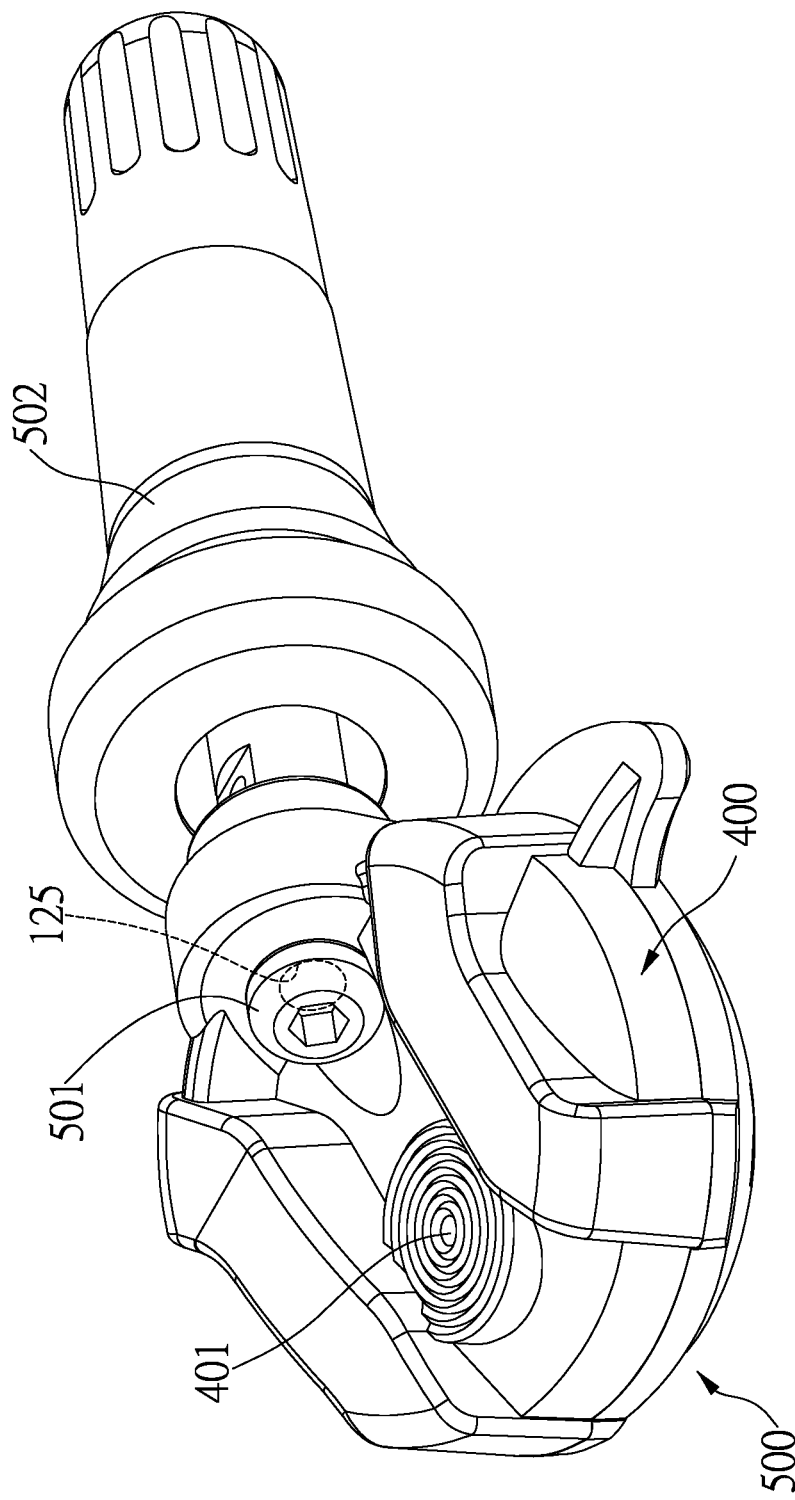
FIG. 8 shows that the tire valve is connected to the tire pressure monitoring sensor made by the second embodiment of the method of the present invention.

As shown in FIGS. 6 to 8, the tire pressure monitoring sensor 500 made by the second embodiment of the packaging method of the present invention is connected to the tire valve 502 by extending a bolt 501 through the bore 125. The tire pressure monitoring sensor 500 made by the second embodiment of the packaging method of the present invention is installed to the wheel frame by the tire valve 502.

While we have shown and described the embodiment in accordance with the present invention, it should be clear to those skilled in the art that further embodiments may be made without departing from the scope of the present invention.

What is claimed is:

1. A packaging method for a tire pressure monitoring sensor, comprising:
   a step of placing: putting a sensing transmission module into a cavity of a modeling unit, a positioning portion located in the cavity restricting the sensing transmission module from moving transversely and toward an inner bottom of the cavity;
   a step of pouring: pouring a rubber compound into the cavity, the rubber compound filling the cavity, an outer surface of the sensing transmission module being coated by the rubber compound so as to form a case on the outer surface of the sensing transmission module;
   a step of hardening: the case being hardened and integrally formed with the sensing transmission module so as to form a tire pressure monitoring sensor, the tire pressure monitoring sensor being removed from the cavity;
   wherein the sensing transmission module includes a circuit board a wireless antenna, a battery emit, an air pressure sensor unit and a control unit, the wireless antenna, the battery unit, the air pressure sensor unit and the control unit are electrically connected to the circuit board, the air pressure sensor unit includes an air pressure hole, the positioning portion includes a plug;
   in the step of placing the plug partially extends into the air pressure hole the plug is partially located in the cavity so as to form a gap between the sensing transmission module and the inner bottom of the cavity;
   in the step of pouring, the rubber compound does not flow to the air pressure hole because of the plug, the rubber compound is located around the plug in the cavity and forms a passage of the case, the rubber compound fills the gap between the sensing transmission module and the inner bottom of the cavity, and
   in the step of hardening, the tire pressure monitoring sensor is removed from the cavity, the passage communicates with the air pressure hole.

2. A packaging method for a tire pressure monitoring sensor, comprising:
   a step of pre-assembling: assembling a sensing transmission module a d a frame to form a pre-set portion, the pre-set portion including multiple paths;
   a step of placing: putting the pre-set portion into a cavity of a modeling unit, a positioning portion located in the cavity restricting the pre-set portion from moving transversely and toward an inner bottom of the cavity;
   a step of pouring: pouring a rubber compound into the cavity, the rubber compound partially flowing to the inner bottom of the cavity via the paths, a portion of the rubber compound coating an outer surface of the pre-set portion and filling the cavity so as to form a case on the outer surface of the pre-set portion;
   a step of hardening: the case being hardened and integrally formed with the pre-set portion so as to form a tire pressure monitoring sensor, the tire pressure monitoring sensor being removed from the cavity;
   wherein the frame includes an outer ring and a valve coat which is integrally formed to the outer ring, the sensing transmission module includes a circuit board, a wireless antenna, a battery unit, an air pressure sensor unit and a control unit, the wireless antenna, the battery unit, the air pressure sensor unit and the control unit are electrically connected to the circuit board, the circuit board is mounted to the outer ring, the outer ring includes multiple pawls which hook the circuit board.

3. The method as claimed in claim 2, wherein the valve coat include two recesses which are respectively formed two sides of the valve coat that is connected to the outer ring, the circuit board includes a yoke in which a notch is formed, two insides of the yoke are engaged with the two recesses, the notch accommodates a portion of the valve coat, the paths are partially located between the notch and the valve coat, the paths are partially formed in an inner periphery of the outer ring and located corresponding to the pawls.

4. The method as claimed in claim 2, wherein the valve coat includes a bore defined therethrough, the air pressure sensor unit includes an air pressure hole, the positioning portion includes a plug and a valve stem,
   in the step of placing, the plug partially extends into the air pressure hole, the valve stem partially extends into the bore, the plug is partially located in the cavity, the valve stem is partially located in the cavity, a gap is formed between the pre-set portion and the inner bottom of the cavity;
   in the step of pouring, the rubber compound does not flow to the air pressure hole and the bore by the plug and the valve step, the rubber compound is located around the plug in the cavity and forms a passage of the case, the rubber compound fills the gap between the pre-set portion and the inner bottom of the cavity, and
   in the step of hardening, the tire pressure monitoring sensor is removed from the cavity, the passage communicates with the air pressure hole.

5. The method as claimed in claim 2, wherein the circuit board includes a first side and a second side which is located opposite to the first side, the wireless antenna, the air pressure sensor unit and the control unit are located on the first side, the second side of the circuit board contacts the outer ring of the frame, the battery unit is located on the second side.

* * * * *